(12) United States Patent  (10) Patent No.: US 9,133,341 B2
Steele et al.  (45) Date of Patent: Sep. 15, 2015

(54) METHODS FOR PRODUCING BINDERS AND COMBUSTIBLE COMPOSITE MATERIALS AND COMPOSITIONS PRODUCED THEREFROM

(75) Inventors: Philip H. Steele, Starkville, MS (US); Venkata K. Penmetsa, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 307 days.

(21) Appl. No.: 13/367,138

(22) Filed: Feb. 6, 2012

(65) Prior Publication Data

US 2013/0031830 A1    Feb. 7, 2013

Related U.S. Application Data

(60) Provisional application No. 61/462,557, filed on Feb. 4, 2011.

(51) Int. Cl.
- *C10L 1/00* (2006.01)
- *C08L 89/00* (2006.01)
- *C08L 91/00* (2006.01)

(52) U.S. Cl.
CPC ............... *C08L 89/00* (2013.01); *C08L 91/00* (2013.01)

(58) Field of Classification Search
USPC .......................................................... 44/535
See application file for complete search history.

(56) References Cited

U.S. PATENT DOCUMENTS

| | | | |
|---|---|---|---|
| 3,395,033 A * | 7/1968 | Remer ...................... 106/190.1 |
| 4,220,453 A | 9/1980 | Holder | |
| 5,091,499 A * | 2/1992 | Chum et al. .................. 528/129 |
| 5,635,123 A | 6/1997 | Riebel et al. | |
| 6,790,271 B2 | 9/2004 | Thames et al. | |
| 2004/0089418 A1 | 5/2004 | Li | |
| 2005/0272892 A1* | 12/2005 | Hse et al. ....................... 527/100 |
| 2007/0148339 A1* | 6/2007 | Wescott et al. ............... 427/180 |
| 2008/0027159 A1 | 1/2008 | Rivers et al. | |
| 2009/0041907 A1 | 2/2009 | Garralda et al. | |
| 2009/0062516 A1* | 3/2009 | Belanger et al. .............. 530/502 |
| 2010/0233475 A1 | 9/2010 | Kantner et al. | |
| 2010/0310877 A1* | 12/2010 | Parker et al. .................. 428/414 |
| 2011/0294927 A1* | 12/2011 | Williams et al. ................ 524/59 |

* cited by examiner

*Primary Examiner* — Ellen McAvoy
*Assistant Examiner* — Ming Cheung Po
(74) *Attorney, Agent, or Firm* — Butler Snow LLP

(57) ABSTRACT

Methods and compositions are provided for producing thermoset, water repellent binders particularly effective for forming combustible composite materials. The binders include a mixture of an alkaline protein hydrolyzate and a bio-oil or an acidic protein hydrolyzate and a lignin compound. Desirably, the binders and the resulting combustible composite materials are substantially free of formaldehyde.

15 Claims, 2 Drawing Sheets

METHODS FOR PRODUCING BINDERS AND COMBUSTIBLE COMPOSITE MATERIALS AND COMPOSITIONS PRODUCED THEREFROM

CROSS-REFERENCE TO RELATED APPLICATIONS

This application claims benefit of U.S. Provisional Application No. 61/462,557 filed Feb. 4, 2011, the disclosure of which is incorporated herein by reference.

FIELD OF THE INVENTION

The present invention is generally directed toward a method of producing a thermoset, water repellent binder for use in combustible composite materials.

BACKGROUND

Increasing concerns about rising oil prices are creating an increased interest in the development of economical and convenient alternative energy sources. For example, alternative energy sources may be derived by pelletizing and/or briquetting mixtures of binders and combustible materials, including coal, char, torrefied wood, and other combustible biomass feedstocks. Existing forms of composite combustible materials and binders, however, often lack the desired properties (i.e., water repellence and strength) and are costly.

For example, several practitioners have utilized bio-oils to produce adhesives for woods and other materials. Bio-oil generally is produced by fast pyrolysis of small biomass particles (i.e., lignocellulosic biomass materials) at 400 to 650° C. in the absence of oxygen. The yield of bio-oil is relatively high, at 60 to 80% dry weight basis. Although the chemical properties of bio-oils vary with the type of biomass feedstock, woody biomass feedstocks typically produce a bio-oil with a mixture of 30% water, 30% phenolics, 20% aldehydes and ketones, 15% alcohols and 10% miscellaneous compounds. In addition, bio-oils can contain up to 45% oxygen and may be highly reactive in combination with certain compounds. Not wishing to be bound by any theory, it is believed that the bio-oil's high phenolics content (about 30%) makes it particularly suitable for use as a substitute for existing commercial phenol-containing synthetic binders produced from fossil sources (i.e., just like the presence of phenols in synthetic binders derived from petroleum, the presence of phenols in the bio-oil imparts a degree of water repellence in any bio-oil containing binders).

In addition to bio-oils, hydrolyzed proteins previously have been used to produce adhesives or binders. The hydrolyzed proteins generally are mixed with phenol-containing compounds and/or resins and are cross-linked with a cross-linking agent to obtain the desired properties. For example, U.S. Pat. No. 7,282,117 discloses an adhesive prepared from vegetable protein hydrolyzates combined with phenol formaldehyde resin and/or isocyanate resin. U.S. Patent Publication No. 2005/0272892 discloses an adhesive for structural composite wood panels, such as oriented strand board, particle board and plywood prepared from a soybean hydrolyzate and the familiar cross-linking agent, formaldehyde. U.S. Pat. No. 3,454,508 describes the cross-linking of alkali lignin with a polymethylol phenol combined with formaldehyde to allow a reduction of up to 80% of the required laminating resin. U.S. Pat. No. 4,113,675 discloses the development of a highly cross-linkable methyloated kraft lignin resin produced by combining a premethylolated kraft lignin with a phenolic cross-linking agent (e.g., formaldehyde). These references all suffer from similar disadvantages by continuing to utilize petroleum-based phenols and cross-linking agents (e.g., formaldehyde) to impart improved adhesive and cross-linking properties to the lignin-substituted formulas.

SUMMARY OF THE DESCRIPTION

Embodiments of the present description address the above-described needs by providing a method for producing a thermoset, water repellant binder comprising combining and reacting a protein hydrolyzate and a second component to form a thermoset, water repellant binder. The protein hydrolyzate is selected from the group consisting of an alkaline protein hydrolyzate and an acidic protein hydrolyzate, while the second component is selected from the group consisting of a bio-oil and a lignin compound. When the protein hydrolyzate comprises an alkaline protein hydrolyzate, the second component comprises a bio-oil. When the protein hydrolyzate comprises an acidic protein hydrolyzate, the second component comprises a lignin compound.

In another aspect, a thermosetting binder composition is provided comprising a protein hydrolyzate and a second component. When the protein hydrolyzate comprises an alkaline protein hydrolyzate, the second component comprises a bio-oil. When the protein hydrolyzate comprises an acidic protein hydrolyzate, the second component comprises a lignin compound.

In still another aspect, combustible composite materials and methods for their preparation are provided. The method for producing a water-repellant, combustible composite material may comprise mixing a combustible material and a binder composition and applying heat and pressure to the mixture of the combustible material and binder composition to obtain a combustible composite material. Desirably, the binder composition comprises a protein hydrolyzate and a second component, wherein the protein hydrolyzate is an alkaline protein hydrolyzate or an acidic protein hydrolyzate, and wherein the second component is a bio-oil or a lignin compound. When the protein hydrolyzate comprises an alkaline protein hydrolyzate, the second component comprises a bio-oil. When the protein hydrolyzate comprises an acidic protein hydrolyzate, the second component comprises a lignin compound.

DETAILED DESCRIPTION

Improved water repellent thermosetting binders are provided along with methods for their production. The methods and compositions are particularly well suited for use in the development of pellets, briquettes or other composite combustible materials suitable for use in the production of energy. The methods and compositions advantageously utilize relatively inexpensive biomass sources to produce the binders while avoiding the disadvantages associated with previous efforts to produce a cross-linked water repellent binder.

Figure 1:
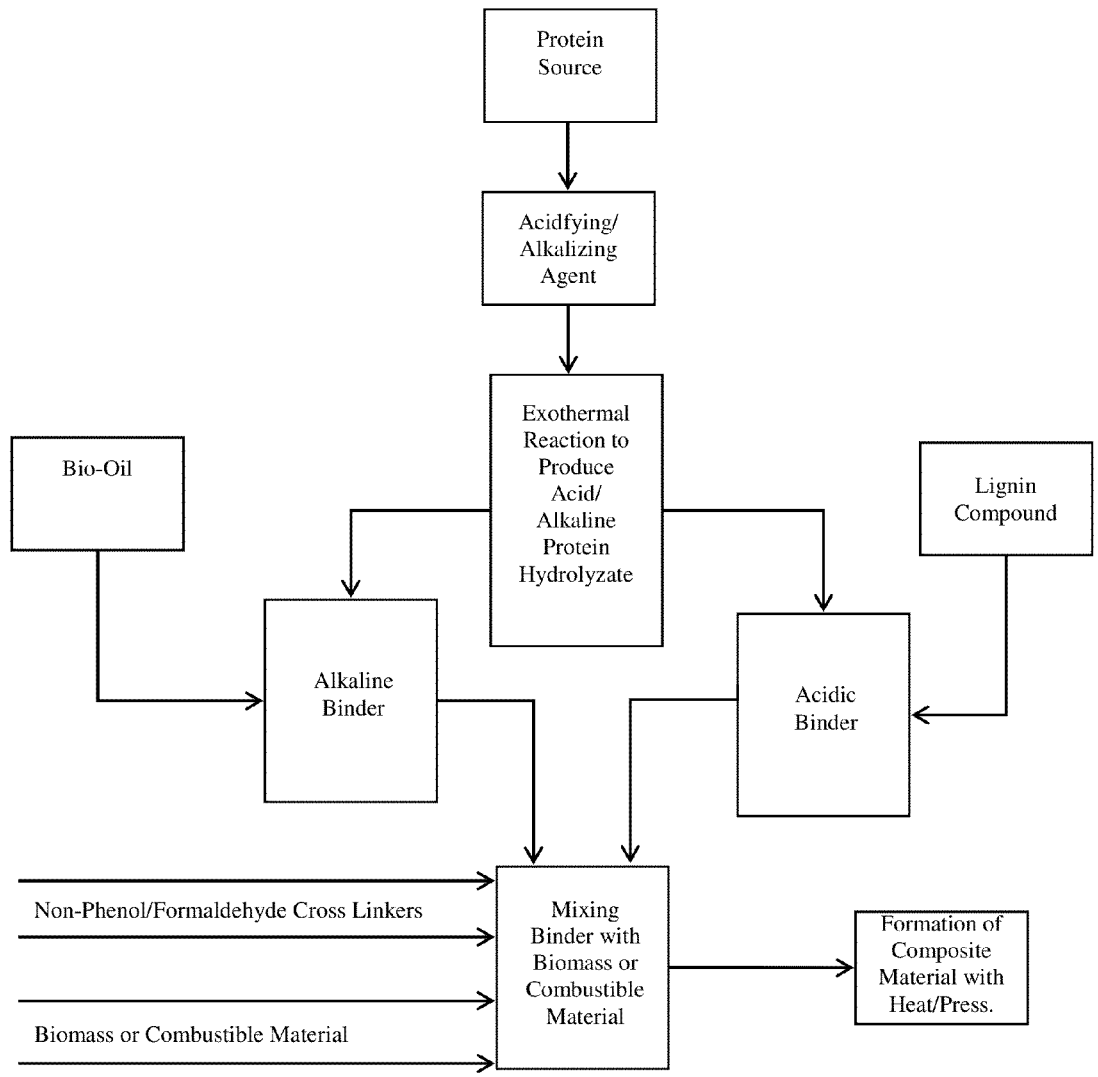
FIG. 1 is a flow chart showing the process for the production of a densified, water repellent solid from a biomass or other combustible material according to an embodiment.

Embodiments of methods for producing thermoset, water repellent binders are illustrated in FIG. 1, and generally comprise combining a protein hydrolyzate and a second component and reacting the protein hydrolyzate and the second component to form the thermoset, water repellant binder. The protein hydrolyzate desirably is an alkaline protein hydrolyzate or an acidic protein hydrolyzate and the second component desirably is a bio-oil or a lignin compound. For example, in an embodiment in which the protein hydrolyzate comprises an alkaline protein hydrolyzate, the second component comprises a bio-oil. Conversely, in an embodiment in which the protein hydrolyzate comprises an acidic protein hydrolyzate the second component comprises a lignin compound.

Not wishing to be bound by any theory, it is believed that the combination of the high pH protein hydrolyzate with the low pH bio-oil or the low pH protein hydrolyzate with the high pH lignin compound results in a slightly exothermic reaction responsible for the cross-linking action that imparts the desired properties to the binders. For example, a bio-oil having a low pH combined with an alkaline protein hydrolyzate undergoes a slight exothermic reaction that results in cross-linking of the bio-oil's phenolic and lignin components with the long-chain proteins in the alkaline protein hydrolyzate.

Accordingly, in embodiments in which the protein hydrolyzate comprises an alkaline protein hydrolyzate, the alkaline protein hydrolyzate has a pH in the range of about 8 to about 13, about 9 to about 12, or about 10 to about 11 while the bio-oil has a pH in the range of about 1 to about 4, from about 2 to about 3, from about 2.5 to about 3, or from about 2.0 to about 2.5. Alternatively, in embodiments in which the protein hydrolyzate comprises an acidic protein hydrolyzate, the acidic protein hydrolyzate has a pH in the range of about 1 to about 4, from about 2 to about 3, or from about 2 to about 2.5 while the lignin compound has a pH in the range of about 8 to about 13, about 8 to about 12, from about 9 to about 11, from about 10 to about 12, or from about 11 to about 12.

The protein hydrolyzate and second component may be combined in any suitable proportion in the binder. In embodiments, the protein hydrolyzate and the second component are present in the binder in a ratio from about 1:5 to about 5:1. In other embodiments, the protein hydrolyzate and the second component are present in the binder in a ratio from about 1:4 to about 4:1, from about 1:3 to about 3:1, from about 1:2 to about 2:1, or about 1:1. For example, in embodiments the protein hydrolyzate comprises from about 25% to about 75% of the binder and the second component comprises from about 75% to about 25% of the binder. In other embodiments, the protein hydrolyzate comprises from about 40% to about 60% of the binder and the second component comprises from about 60% to about 40% of the binder. In still other embodiments, the protein hydrolyzate comprises about 50% of the binder and the second component comprises about 50% of the binder.

Other components also may be added to the binders to further improve the properties (i.e., water repellence) that the binders can impart to the composite materials to which they are added. However, the binders desirably have a total solid content from about 20% to about 70% by weight and desirably are substantially free of conventional cross-linking agents and/or petroleum-derived phenols. For example, in embodiments the binders are substantially free of formaldehyde.

Protein Hydrolyzates

The alkaline protein hydrolyzate or acidic protein hydrolyzate may be prepared using any suitable protein source. For example, in embodiments the protein source from which the protein hydrolyzate is derived may include an animal or plant-based product, non-limiting examples of which include soy beans, rendered livestock, fishmeal, chicken feathers, etc. In preferred embodiments, the protein source from which the protein hydrolyzate is derived is from ground whole soy beans (i.e., soy bean mill flour), which includes both soy protein and soy oil components. Not wishing to be bound by any theory, it is believed that the inclusion of the soy oil in the protein source provides additional water repellence properties that processed soy meal with the soy oil removed does not provide.

The protein hydrolyzates may be prepared using any suitable method of hydrolyzing the protein source. Desirably, the protein hydrolyzate is prepared by heating a mixture of a protein source and either an alkalizing agent or an acidifying agent at a temperature sufficient and for a time sufficient to produce the desired protein hydrolyzate. For example, in embodiments the mixture is heated to a temperature of at least 120° C. for a period and is reacted for about 45 minutes. However, those of ordinary skill in the art will appreciate that reaction temperatures and times may be modified to obtain the desired alkaline or acidic protein hydrolyzate. In addition, the proportion of the alkalizing or acidifying agent and protein source, the molarity of the alkalizing or acidifying agent, and the amount of water used during the preparation of the protein hydrolyzate also may be modified to obtain the desired properties of the resulting protein hydrolyzates. For example, in particular embodiments the reaction mixture used to produce the protein hydrolyzate may include a protein source (30 wt %), water (45 wt %), and an alkalizing or acidifying agent (25 wt %).

In embodiments, suitable alkalizing agents for use in preparing the alkaline protein hydrolyzate include strong bases, non-limiting examples of which include calcium hydroxide, sodium hydroxide, and potassium hydroxide. In embodiments, suitable acidifying agents for use in preparing the acidic protein hydrolyzate include strong acids, non-limiting examples of which include hydrochloric acid, nitric acid, sulfuric acid, and phosphoric acid.

Bio-Oils

The bio-oils may be prepared by using any suitable method to produce a bio-oil from a suitable biomass. For example, in particular embodiments the bio-oils are prepared by fast pyrolysis of a suitable biomass feedstock using methods known to those of ordinary skill in the art. Alternatively, the bio-oils may be prepared by slow pyrolysis. The resulting bio-oils then may be used in whole or in part. For example, in embodiments it may be desirable to fractionate the bio-oil to obtain both water soluble and organic fractions of the bio-oil; however, it is desired that the bio-oil or fraction thereof have a combined content of lignin derivatives and phenols of at least about 20%, or greater.

In particular embodiments, the bio-oil is prepared from a biomass feedstock comprising pine wood, which typically has a higher lignin content than hardwoods, agricultural crops, or agricultural residues. Thus, the phenolic and lignin content of bio-oils derived from pine wood can be maximized and a superior water repellent binder can be produced.

In certain other embodiments, the biomass feedstock comprises a pine bark. Bark-derived bio-oils have a higher phenol content (7.4 to 11.5%) than those produced from wood, but also have been shown to increase in viscosity at a higher rate. In still other embodiments, the biomass feedstock has a higher lignin content (e.g., a dried lignin produced from an industrial process) and may provide both a higher phenol and lignin content. However, it should be appreciated that other biomass feedstocks may be used to produce bio-oils with high lignin and phenol contents.

Lignin Compounds

The lignin component of the lignin-based binder may be obtained from any suitable lignin source having a high pH. In embodiments, the lignin component is a black liquor. Black liquors may be obtained from various industrial processes, including paper production of pine wood and other biomass sources. For example, the black liquor may be produced by cooking a woody biomass in a digester of a kraft paper manufacturing process. The black liquor is produced by treating the woody biomass with a strong alkalizing agent, such as sodium hydroxide and sodium sulfide, to produce a black lignin-containing liquid having a pH of about 12.5. The black liquor then may, or may not be, be fractionated or separated and any fraction thereof may be used as the lignin compound.

Many other sources also may used to supply the required lignin compound. For example, in embodiments the lignin compound may be obtained from a lignosulfonate obtained from black liquor (e.g., sodium lignosulphonate, calcium lignosulfonate, or sodium ammonium lignosulfonate), an organosolv lignin, a kraft lignin, a steam-exploded wood residues, an enzymatic brown rotted wood, a methylolated lignin, or lignin or lignin compounds derived from other suitable sources using any suitable means known to those of ordinary skill in the art.

Uses of Thermoset Binder Compositions

The thermoset binders provided in embodiments herein desirably may be used in a variety of different manners. For example, in embodiments the binder may be used for the production of combustible composite materials having improved density, water repellence, and strength. For example, in embodiments the combustible composite material are substantially water repellent, wherein the water repellence is characterized by the material gaining less than about 2 wt % of water over 98 hours. Beyond densifying and adding water repellence to combustible materials, the addition of the binder is also a benefit in that it significantly increases the pellet energy value. For example, for a binder produced by addition of 40 wt % of alkaline soy hydrolyzate combined with 60 wt % of bio-oil, the higher heating value (HHV) increase was from 18.5 MJ/kg to 20.3 MJ/kg (9.7%) for a torrefied wood pellet that was a 1-inch long, ½-inch diameter pellet with density of 1180 kg/m$^3$. This HHV increase will considerably improve the economics of utilization of the binder as disclosed compared to a binder that adds little to the energy value of the bound combustible.

The combustible composite materials may be prepared using any suitable material for the production of a solid form, non-limiting examples of which include application of heat and pressure to a mixture of the combustible material and binder with a pelletizer, extruder, press, or other suitable means. The combustible materials used in the combustible composite material may include any suitable energy source, non-limiting examples of which include biomass, char, coal, torrefied wood, municipal solid waste, or combinations thereof, that is suitable for producing pellets, briquettes, or other suitable solids. For example, in embodiments the combustible material comprises a biomass treated only by comminution to the proper particle size to produce a composite combustible material known to those of ordinary skill in the art as a "white" pellet or briquette. The combustible composite materials also may include other materials to improve the desired properties of the resulting solid (e.g., by minimizing pellet degradation during transportation). Non-limiting examples of other such materials may include organic fibers (e.g., oil cakes of ground nut, wheat bran, cottonseed, sesame, jatropha, corn, mustard, sunflower, soy, castor, etc.). Other non-limiting examples includes fibers separated from distillers dried grains with solubles in a dry grind corn process, and other natural or synthetic fibers.

In other embodiments, the thermoset binders may be used in the production of other wood or pulp-based products, including the production of oriented strand board and exterior plywood. In still other embodiments, the thermoset binders provided herein may be used in the production of consumer fire logs, which currently utilize waxes that have increased dramatically in price.

The present methods and compositions can be further understood and illustrated by the following non-limiting examples.

EXAMPLES

Example 1

Torrefied Wood Pellets Prepared with Alkaline Protein Hydrolyzate-Based Binders

Alkaline protein hydrolyzates were prepared by grinding whole soy beans to a flour and then subsequently hydrolyzing the whole soy bean flour. The hydrolysis was performed in a closed, stirred reactor capable of attaining a temperature of at least 120° C. A mixture of 45 wt % water, 25 wt % sodium hydroxide (50 M), and 30 wt % whole soy bean flour was added to the reactor, heated to a temperature of about 120° C., and stirred continuously for about 45 minutes at that temperature to produce a smooth, light brown homogeneous solution having a viscosity of 130 cps and a pH of 12.0.

Bio-oil was produced on an auger feed pyrolysis reactor which processes 7 kg/h of biomass using typical pyrolysis conditions. A pine wood feedstock was used and a bio-oil was produced having a composition of approximately 25% water, 16% lignin derivatives, 10% phenols, 13% carboxylic acids, 15% aldehydes, 9% carbohydrates, 5% furfurals, 2% alcohols and 5% ketones.

The alkaline protein hydrolyzate and the bio-oil were combined at a ratio of 3:2, 2:3, and 1:1 to prepare the binder. Upon mixing, a slight exothermic reaction occurred which resulted in warming of the binder. This resulting binder was subsequently cooled before preparation of the torrefied wood pellets, which were prepared by mixing 30-40 wt % of the binder and torrefied wood, loading the mixture into a pellet fixture, rapidly heating the mixture to 150° C. and compressing the materials using a steel press at 300 psi, and cooling the pellet. The compressive strength of the torrefied wood pellets was subsequently evaluated using a universal testing machine. The compression was tested along the length of the pellet using a modified ball test with a "ball" having an 11.3 mm diameter. The compressive load was applied to the surface of each pellet at a rate of 6 mm/min until failure occurred, which was defined to occur when slight flaking of the pellet occurred rather than total failure. The load at failure was recorded and stress values were computed. The results are illustrated in the table below.

| Pellet Composition | | Binder Composition | | Compression |
| --- | --- | --- | --- | --- |
| Torrefied Wood (%) | Binder (%) | Alkaline Protein Hydrolyzate (%) | Raw Bio-Oil (%) | strength (psi) |
| 70 | 30 | 60 | 40 | 501 |
| 70 | 30 | 40 | 60 | 801 |
| 60 | 40 | 50 | 50 | 1095 |

The results indicated that a greater compression strength was obtained for binder compositions having a 1:1 ratio the alkaline protein hydrolyzate to the bio-oil (i.e., 50 wt % alkaline protein hydrolyzate and 50 wt % bio-oil). By increasing the ratio of alkaline protein hydrolyzate to the bio-oil to 3:2 (i.e., 60 wt % of alkaline protein hydrolyzate and 40 wt % bio-oil), the compressive strength of the torrefied wood pellets was decreased by nearly 50%. By decreasing the ratio of alkaline protein hydrolyzate to the bio-oil to 2:3 (i.e., 40 wt % of alkaline protein hydrolyzate and 60 wt % of bio-oil), the compressive strength of the torrefied wood pellets was decreased by only 20%; however, reduction of the amount of alkaline protein hydrolyzate will result in a lower cost binder due to the fact that bio-oil is significantly cheaper than the alkaline protein hydrolyzate (e.g., about 50% in the present example). The composition containing 60% bio-oil and 40% hydrolyzate provides 80% of the compressive strength of the composition with equal proportions of hydrolyzate and bio-oil.

Torrefied wood pellets also were prepared using varying amounts of binder to determine the effect of the binder on both the compression strength and water repellence of the resulting pellets. A binder having a 2:3 ratio of alkaline protein hydrolyzate to bio-oil was prepared as described above. The torrefied wood pellets were prepared as described above using amounts of binder ranging from 2 to 30 wt %. Matching pellets with identical percentages of binder and torrefied wood were produced that were then immersed completely in water for 14 days. The weight of the water soaked pellets were oven dried and examined for integrity. No decomposition and no flaking resulted. The dried pellets were then tested for strength in compression. The results are summarized in the table below.

| Spec. no. | Weight (g) | Percentage of binder (%) | Compression strength (kg/m$^2$) | Compression strength (kg/m$^2$) after 14 days in water | Reduction in compression strength (%) |
|---|---|---|---|---|---|
| 1 | 16.80 | 30 | 1095 | 960 | 12.3 |
| 2 | 16.92 | 20 | 987 | 846 | 14.3 |
| 4 | 16.90 | 10 | 905 | 718 | 20.6 |
| 5 | 16.39 | 5 | 841 | 630 | 25.1 |
| 6 | 16.42 | 2 | 764 | 519 | 32.1 |

The results showed that compression strength loss was a linear function of binder loading, with the 30 wt % pellets losing only 12.3% of compressive strength to maintain strength of 960 psi. Comparatively, the pellets loaded with 2 wt % of binder lost 32.1% of initial compressive strength but continued to maintain strength of 519 psi.

Figure 2:
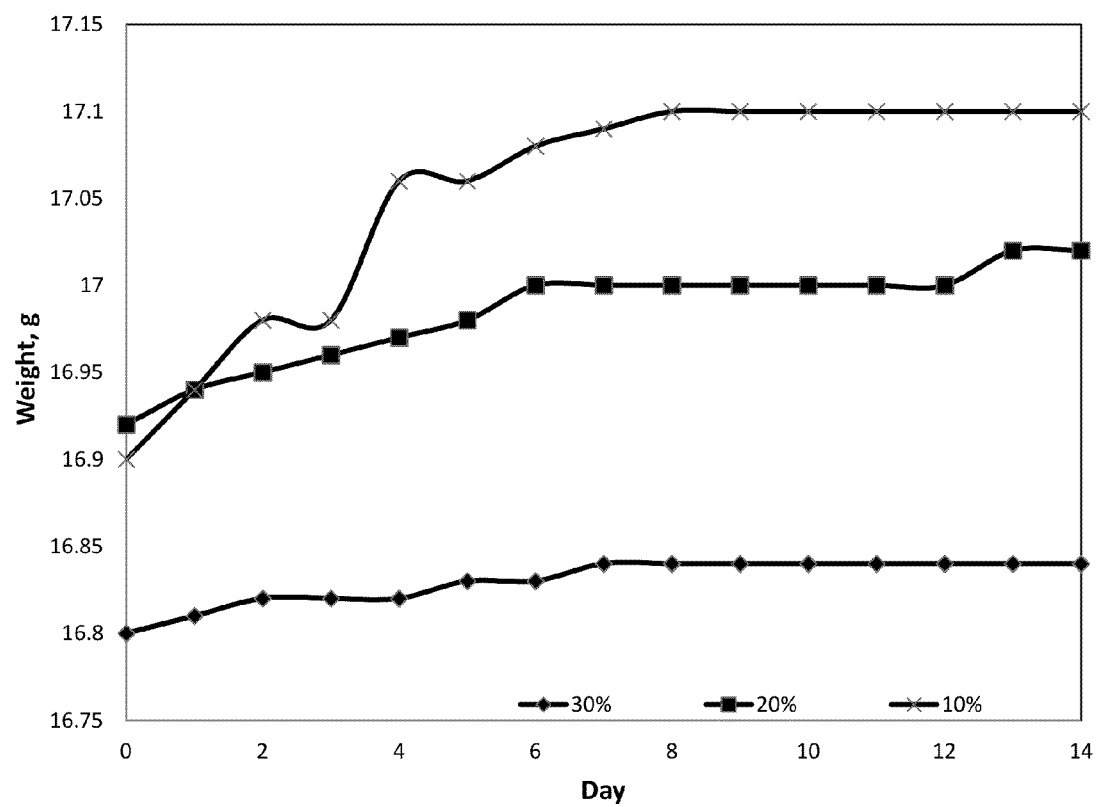
FIG. 2 is a graph showing the daily water weight absorption values by pellet binder proportion over 14 days of soaking.

FIG. 2 shows the daily water gain for the torrefied wood pellets for each of binder loadings tested (10, 20 and 30 wt %). These results indicate that for binder loadings of 10 wt % and higher the absorption of water is negligible after 5 days of immersion. These results indicate that there is a limited pore space in the bound pellets relative to each binder loading. After 5 days for the 30% binder loading a pellet weighting 16.8 g absorbed a maximum of 0.04 g of water after 5 days; for the 20% binder loading a pellet weighing 16.92 g absorbed a maximum of about 0.06 g of water; for the 10% binder loading a pellet weighing 16.9 g absorbed a maximum of 0.9 g of water. The relative water absorption percentage by loading treatment were 0.2% for the 30% loading, 0.3% for the 20% loading and 0.5% for the 10% loading. These results indicate that, after 5 days, the pore spaces left by each loading treatment were filled to their maximum with water and the pellet would absorb no more. In addition, there is very little difference in water absorption for any treatment of 10% and above. The pellets are essentially water proof at loadings at, or above 10%.

Not wishing to be bound by any theory, it is believed that loading pellets at the higher levels (i.e., above 10 wt %) may not be economically prudent unless there is a need for a nearly completely water proof pellet. Based on the fact that a 2 wt % pellet maintained a compressive strength of more than 67% of the original value and maintained full integrity, the 2% loading may be a particularly economic choice to obtain a product that performs well in terms of water repellence when completely submerged in water for a long period of time.

Example 2

Torrefied Wood Pellets Prepared with Acidic Protein Hydrolyzate-Based Binders

An acidic protein hydrolyzate was prepared using a method similar to that described above for the preparation of the alkaline protein hydrolyzate, with the exception that sulfuric acid was utilized rather than sodium hydroxide. A mixture of 45 wt % of water, 25 wt % sulfuric acid (18 M), and 30 wt % whole soy bean flour were combined in the reactor, brought to temperature of 120° C., and stirred continuously for 45 minutes at that temperature to produce a smooth, light brown homogeneous solution having a viscosity of 80 cps and a pH of 2.0.

A binder was prepared by combining the acidic protein hydrolyzate (pH of 2.0) with an alkaline lignin composition (pH of 11 to 12) at a ratio of 1:1 (50 wt % acidic protein hydrolyzate and 50 wt % black liquor). Again, the wide difference in pH resulted in a slightly exothermic reaction with cross-linking of the proteins contained in the hydrolyzate with the lignins contained in the black liquor. Torrefied wood pellets were subsequently produced as described above using 2 wt % binder, but the binder amounts as low as 0.3% can be used. The pellets were immersed in water for 10 days followed by oven drying to zero percent water content. Again, no flaking of the pellets was observed and pellet integrity was maintained.

The pellets were evaluated to determine compressive strength before water immersion and immediately after oven drying. Compression strength of the non-soaked pellet was 725 psi; however, compression strength following drying was reduced by 30% to 510 psi. These results suggest that the pellets produced with the alkaline protein hydrolyzate-based binder had a higher initial strength and maintained their strength better following water immersion than the pellets produced with the acidic protein-hydrolyzate based binder. However, the availability of various lignin compounds at a low cost suggests that this path to production of an energy pellet, briquette or other product would be commercially viable.

This disclosure is illustrative and not limiting. Further modifications will be apparent to one skilled in the art in light of this disclosure and such modifications are intended to fall within the scope of the appended claims. Each publication and patent application cited in the specification is incorporated herein by reference in its entirety as if each individual publication or patent application were specifically and individually put forth herein.

The invention claimed is:

1. A method for producing a thermosetting water repellent binder comprising:

combining a protein hydrolyzate and a second component, wherein the protein hydrolyzate comprises an alkaline protein hydrolyzate having a pH of about 8 to about 13 and the second component comprises an acidic pyrolytic bio-oil having a pH of about 1 to about 4; and exothermally reacting the protein hydrolyzate and the second component to form a cross-linked thermosetting water repellent binder.

2. The method of claim 1, wherein the protein hydrolyzate and the second component are present in the binder in a ratio from about 1:3 to about 3:1.

3. The method of claim 1, wherein the alkaline protein hydrolyzate is prepared by heating a mixture of a protein source and an alkalizing agent for a time sufficient to produce the alkaline protein hydrolyzate.

4. The method of claim 1, wherein the protein hydrolyzate is derived from a protein source selected from the group consisting of soy meal, rendered livestock, fishmeal, chicken feathers, and combinations thereof.

5. The method of claim 1, wherein the step of exothermally reacting the protein hydrolyzate and the second component is effective to induce cross-linking of the protein hydrolyzate and the second component of the binder without addition of cross-linking agents such that the binder is substantially free of such cross-linking agents.

6. A method for producing a thermosetting water repellent binder comprising:

combining a protein hydrolyzate and a second component, wherein the protein hydrolyzate comprises an alkaline protein hydrolyzate and the second component comprises an acidic pyrolytic bio-oil with a combined lignin derivative and phenol content of greater than about 20%; and exothermally reacting the protein hydrolyzate and the second component to form a cross-linked thermosetting water repellent binder.

7. The method of claim 6, wherein the protein hydrolyzate and the second component are present in the binder in a ratio from about 1:3 to about 3:1.

8. The method of claim 6, wherein the alkaline protein hydrolyzate is prepared by heating a mixture of a protein source and an alkalizing agent for a time sufficient to produce the alkaline protein hydrolyzate.

9. The method of claim 6, wherein the protein hydrolyzate is derived from a protein source selected from the group consisting of soy meal, rendered livestock, fishmeal, chicken feathers, and combinations thereof.

10. The method of claim 6, wherein the step of exothermally reacting the protein hydrolyzate and the second component is effective to induce cross-linking of the protein hydrolyzate and the second component of the binder without addition of cross-linking agents such that the binder is substantially free of such cross-linking agents.

11. A thermosetting binder composition comprising an alkaline protein hydrolyzate reacted with an acidic pyrolytic bio-oil.

12. The composition of claim 11, wherein the alkaline protein hydrolyzate and the acidic pyrolytic bio-oil are present in the composition at a ratio from about 1:3 to about 3:1.

13. The composition of claim 11, wherein the composition is substantially free of any cross-linking agents.

14. The composition of claim 11, wherein the acidic pyrolytic bio-oil is derived from fast or slow pyrolysis of a biomass or lignin.

15. The composition of claim 14, wherein the biomass is pine wood.

\* \* \* \* \*